United States Patent
Wear

[11] 3,966,680
[45] June 29, 1976

[54] PHENOXY-S-TRIAZINE CHAIN COUPLER FOR POLYESTERIFICATION AND NOVEL POLYESTERS

[75] Inventor: Robert L. Wear, West St. Paul, Minn.

[73] Assignee: Minnesota Mining and Manufacturing Company, St. Paul, Minn.

[22] Filed: May 27, 1975

[21] Appl. No.: 580,714

Related U.S. Application Data

[63] Continuation of Ser. No. 424,351, Dec. 13, 1973, abandoned, which is a continuation-in-part of Ser. No. 323,626, Jan. 15, 1973, abandoned.

[52] U.S. Cl. .......................... 260/47 C; 260/75 R; 260/75 N
[51] Int. Cl.² ................. C08G 63/66; C08G 63/68
[58] Field of Search ............. 260/47 C, 75 R, 75 N Primary Examiner—Lester L. Lee
Attorney, Agent, or Firm—Alexander, Sell, Steldt & DeLaHunt

[57] ABSTRACT

A novel class of chain-coupling compounds for polyesterification reactions which are represented by the formula:

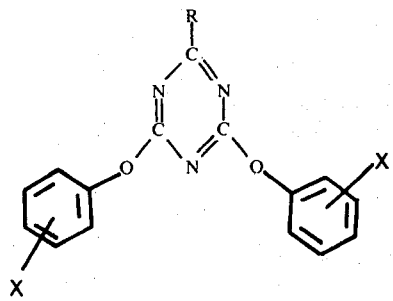

wherein R is an organic radical which will not render the chain-coupling compound thermally unstable at about 280°C, and
X is an inert substituent
are added to polyesterification reaction mixtures after initiation of the reaction to produce novel polyesters containing a residue of the chain-coupling compound bound into the polymer chain. Reduced polymerization times and improved thermal stability can be obtained through use of these chain-coupling compounds.

8 Claims, No Drawings

PHENOXY-S-TRIAZINE CHAIN COUPLER FOR POLYESTERIFICATION AND NOVEL POLYESTERS

This is a continuation, application Ser. No. 424,351 filed Dec. 13, 1973, which is a continuation-in-part of Ser. No. 323,626, filed Jan. 15, 1973, now both abandoned.

The generally accepted method of preparing polyester materials with film or fiber forming capabilities is to form a polymerization monomer (a diester) by reacting a dicarboxylic compound (e.g., a dibasic acid or its lower aliphatic ester) with a dihydric alcohol or its functional derivatives, most preferably with a stoichiometric excess of the alcohol. This monomer is then caused to undergo condensation polymerization by heating in the presence of a catalyst. Residual dihydric alcohol is removed from the system during this step by vacuum distillation.

Until recently, this reaction was limited in the extent to which it would proceed, for the polymerization system would "top out", or reach a point where further polymerization would not take place, even though the polymer may not have as high a molecular weight as desired. The intrinsic viscosity of the polymer would rarely surpass about 0.8 even with extremely long reaction times.

The apparent rate of polycondensation reactions for polyesters (e.g., polyethylene terephthalate) is dependent upon the elimination of liberated by-products since the reaction is essentially an equilibrium reaction. For example, in the polycondensation of polyethylene terephthalate, the reaction is

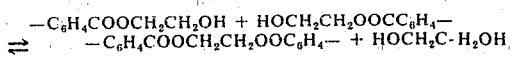

$$-C_6H_4COOCH_2CH_2OH + HOCH_2CH_2OOCC_6H_4-$$
$$\rightleftharpoons -C_6H_4COOCH_2CH_2OOC_6H_4- + HOCH_2C\cdot H_2OH$$

During the early stages of polycondensation, the diol product can diffuse through the system readily. But as the reaction proceeds, the viscosity increases markedly, reducing the ability of the diol to be removed from the system, even under vacuum. Also side reactions occur which result in the formation of carboxylic groups, aldehydes, etc., thus limiting the molecular weight attainable. Because of this topping out, it is very difficult to produce high molecular weight polyesters having intrinsic viscosities of greater than 0.8.

It has previously been found that the reaction mechanism and hence the inhibiting reaction equilibrium can be changed by using specific diesters in the reaction mixture (Polymer Preprints, Vol. 13, No. 1, pp. 578–583, (1972)). Subsequent experimentation with these diester additives has shown that the resultant polyesters, although exhibiting some improved characteristics over previous polyesters, do not substantially increase the reaction rate.

One aspect of this invention concerns the use of novel chain-coupling agents for polyesterification reactions which will overcome some of the problems attendant upon other chain-coupling agents.

It is another aspect of this invention to use novel chain-coupling agents in forming high molecular weight polyesters, at a rapid rate of polymerization.

It is a further aspect of this invention to produce novel polyesters containing therein the residue of the chain-coupling agents of this invention.

It has been found in this invention that certain polyphenoxy-substituted s-triazine derivatives significantly increase the rate of polyester (e.g., polyethylene terephthalate) formation when added to the reaction mixture as a chain-coupler. It has further been found, according to the practice of this invention that certain polyphenoxy-substituted s-triazine derivatives improve the thermal stability of polyester films.

The compounds of this invention may be represented by the formula:

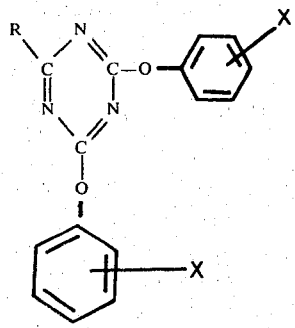

wherein R is an organic radical which will not render the chain coupling compound unstable at a temperature of about 280°C,
and X is an inert substituent.

An inert substituent for the practice of this invention is one which is not reactive with the components in a polyesterification reaction mixture (e.g., not reactive with carboxylic groups, alcohol groups, or ester groups as they are present in the reaction mixture). By inert, it is further meant that the compound is not rendered thermally unstable at 280°C by the addition of this group.

The organic radicals which can be group R are those which do not render the coupling compound thermally unstable at 280°C. Because R need not be a functional group in the chain coupling reaction, any organic radical which will not prevent the remaining two phenoxy groups from reacting is satisfactory for the practice of this invention. Because of the geometry of the cyanurate nucleus, the reactive phenoxy groups are physically removed from the R group and steric hindrance with even long chain groups is minimized. Preferably, however, in order to further minimize any hindering effect there should be no more than about 18 atoms in the backbone or skeletal structure of the R group (e.g., an 18-carbon alkyl, a phenyl group with two hexyl substituents, a naphthyl group with the total substituents having no more than about 8 atoms in the backbone of the substituents, 5 and 6 membered heterocyclic rings (with N and/or O as ring members) with their substituents having no more than about 13 or 12 backbone atoms, respectively. Organic groups which are reactive within the polyesterification reaction may also be used in the practice of this invention; in fact, triphenyl cyanurate, where R is

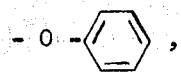

is the most preferred chain coupler contemplated in the practice of this invention at the present time.

Furthermore, although definitely not a preferred embodiment in the practice of this invention, the R group may be tolerated when it is reactive with the phenoxy groups of the coupling compound. Effectively this will reduce the efficiency of the chain-coupler, but it will still act as a chain coupler even when two of the original substituted cyanurate couplers join through a phenoxy and the reactive R group. The preferred R group will be substantially inert to reaction with phenoxy groups at temperatures below about 280°C.

When added to the reaction mixture of a polyesterification process, e.g., for forming polyethylene terephthalate, the couplers of this reaction will become part of the skeletal chain approximately in the following manner.

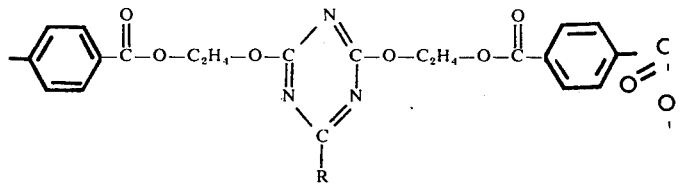

Where R is reactive in the polyesterification reaction (e.g., R is phenoxy) some three-dimensional chain coupling, or more appropriately, cross-linking, occurs. This leaves a residue of the trifunctional chain coupler, e.g.,

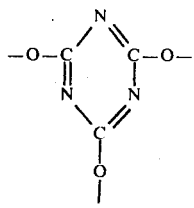

in the backbone of the polymer. Surprisingly, these trifunctional couplers do not leave the polyester with undesirable flexural and elastic properties (e.g., brittleness or rigidity) as might be expected from cross-linking.

The preferred class of organic radicals which are represented by R include phenoxy, phenyl, lower alkoxy (up to about 6 carbon atoms), an alkylamine (e.g., methyl amine) with up to 6 carbon atoms in an alkyl chain (lower alkylamine), an anilino, diphenylamino, or pyrrolidino group, or any 5 or 6 membered heterocyclic radical having at least 4 carbon atoms in the ring chain and where the remaining members of the ring may be nitrogen or oxygen with at most one oxygen atom in the ring chain. These radicals, when used as R in the chain couplers of this invention, may, of course, bear substituents so long as they do not render the chain coupling compounds thermally unstable at about 280°C.

The preferred radicals which may be used as the inert substituent X include hydrogen, halide, lower alkoxy (up to about 6 carbon atoms), and lower alkyl (up to about 6 carbon atoms). Other inert substituents may be used and selected when specific effects are defined or tolerable in the polyester product. For example, higher alkyl groups may be used (e.g., 18 carbon atoms) although some foaming may be associated with the polyesterification because of the effects of such a group on the surface tension of the composition. Therefore, with group X, the more preferred characteristics are that it be inert and have no more than about 6 atoms in its backbone.

Synthesis of the compounds used in this invention is performed through the following general reaction mechanisms:

I. For compounds of the general formula:

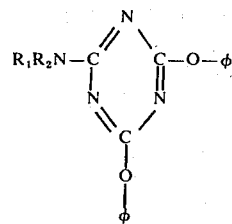

wherein $R_1$ and $R_2$ are hydrogen or aliphatic groups, triphenyl cyanurate is reacted with the corresponding aliphatic amine in dioxane solution at moderate temperatures. The product may be filtered and recrystallized from ethyl acetate, methyl ethyl ketone, etc.

II. For aromatic amine substituted compounds of the general formula:

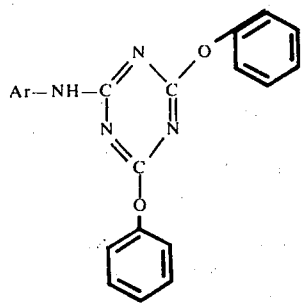

wherein Ar represents the aromatic function described as useful in the practice of this invention. Cyanuric chloride is reacted with the corresponding aromatic amine in dioxane solution at low temperatures. The product, which may be precipitated in water is then heated with sodium phenate to yield the diphenoxy aromatic amine substituted cyanurate.

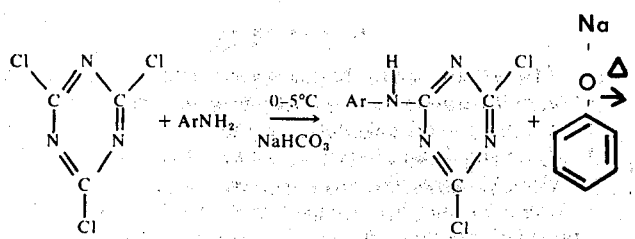

III. For certain aromatic substituent compounds, the Gringard reaction may be used to form the aromatic substituted dichloro-s-triazine:

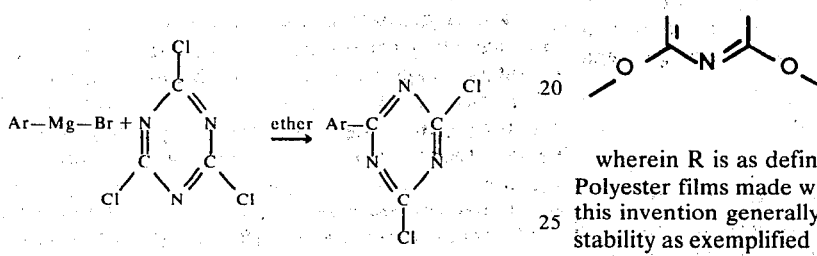

The resulting aromatic substituted dichloro-s-triazine may be converted to the diphenoxy triazine derivative by reaction with sodium phenoxide.

Triphenyl cyanurate may be readily prepared by reacting cyanuric chloride and sodium phenate in a dioxane-water medium (F. C. Schaefer et al., J.A.C.S. 73, 2990, (1951)). It may also be prepared by reacting cyanuric chloride and phenol at 180°–210°C (Schaefer, ibid). Trisubstituted phenyl cyanurates are prepared similarly.

In the use of these compounds as chain-coupling agents, it has been found that the properties of the final polymerization product are affected by the time at which the coupling agent is added during the polymerization process. If the phenoxy-s-triazine compounds of this invention are added to the polymerizable mixture prior to the initiation of any polymerization, the film properties of the polyester are adversely affected; the resulting films will have inferior tensile strength and elongation properties. Beyond a certain point in the polymerization of the mixture, it becomes physically difficult to incorporate the chain-couplers. Therefore, even though the phenoxy-s-triazine compound will work as chain-couplers whenever they are added to polyester polymerizable systems, it has been found advantageous to add them to the system when the intrinsic viscosity has risen, indicating an advancement of the polyesterification reaction. This is preferably done when an intrinsic viscosity of at least about 0.2 has been reached and most preferably when an intrinsic viscosity of about 0.3 has been reached. Thereafter, the reaction of the polymerizable system is allowed to continue or further heated to maintain the fluid state of the reaction mixture.

The polyester products of a polyesterification reaction with these compounds as chain-coupling agents will contain a residue of the chain-coupling agent within the polymer chain. There would be basically two types of recognizable residues in the polymer chain:

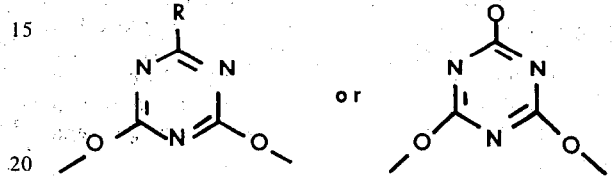

wherein R is as defined above.

Polyester films made with the chain-coupling agents of this invention generally exhibit an increase in thermal stability as exemplified by increased flex life after treating over conventional polyester films made with other chain-coupling agents or without any chain-coupling agents.

As stated earlier in the discussion of the polyesters useful in the practice of this invention, the chain coupling agents of this invention are useful in polymerization processes wherein esterification (polyesterification) occurs during the reaction of polycarboxylic compounds (polycarboxylic acid compounds or poly(lower aliphatic) esters of the acids) and polyhydric alcohols, most preferably with a stoichiometric excess of the alcohol. The products of such reactions include polyethylene terephthalate, polyethylenenaphthalene 2,6-dicarboxylate, (also 2,7-; 1,5-dicarboxylates) and polybutylene terephthalate. Any polyester, however, formed by the polymerization of polycarboxylic acidic compounds (preferably dicarboxylic) and polyols (preferably dihydric primary alcohols, although including secondary alcohols) are useful in the practice of this invention. Copolyesters and blends of monomers are also useful in the practice of the invention.

A further understanding of the present invention will be appreciated from the following examples

EXAMPLE I

Preparation of Triphenyl Cyanurate

Phenol (290 g., 3.1 moles) was added to a solution of sodium hydroxide (124 g., 3.1 moles) in 1.2 liters of water to form sodium phenate. After cooling in an ice-bath, the resulting sodium phenate solution was added over a period of one-half hour to a cooled, stirred solution of cyanuric chloride (185 g., 1.0 mole) in 700 ml. of dioxane. The temperature was kept at 10°–20°C. during the addition. After two hours the ice-bath was removed and stirring continued for four hours. After standing overnight the reaction mixture was filtered, and the residue throughly washed on the filter with several portions of hot water. The product was initially air-dried and then oven-dried at 120°C. Yield of white crystalline solid was 350 g. (98%), m.p. 234°–235°C. Reported m.p., 235°–236°C.

EXAMPLE II

Preparation of 2-Morpholino-4,6-Diphenoxy-s-Triazine

Morpholine (23 ml., 0.25 mole) was added to a stirred suspension of 90 g. (0.25 mole) of triphenyl cyanurate and 180 ml. of dioxane. The temperature increased to 45°C. and then decreased. The mixture was slowly heated to 85°C. and held for one hour. The solid dissolved during the heating period and formed an ambercolored. solution. After standing overnight, the crystalline precipitate in the reaction mixture was collected, washed with dioxane and methanol. The yield was 67.4 g. (77%), m.p. 166.5°–168°C. Recrystallization of a small sample from ethyl acetate did not change the melting point. An additional 20 g. of less pure material was obtained by pouring the above filtrate into water and collecting the solid which separated.

EXAMPLE III

Preparation of 2-Diphenylamino-4,6-Diphenoxy-s-Triazine

Cyanuric chloride (37 g., 0.2 mole) was dissolved with stirring in 100 ml. of dioxane. To this was added a solution of diphenylamine (33.8 g., 0.2 mole) in 20 ml. of dioxane. There was no exotherm produced by this addition. With cooling, triethylamine (30 ml., 0.2+ mole) was then added dropwise. This addition resulted in an exotherm and a precipitate formed. After the addition, the mixture was allowed to warm to room temperature and then immersed in water. An oil formed which soon solidified. The solid was collected and washed with water. It was then slurried with ethanol, filtered and washed thoroughly with ethanol. The yield of 2-diphenylamino-4,6-dichloro-s-triazine was 26.5 g. (42%), m.p. 175°C.

The dichloro derivative (42 g., 0.13 mole) was added to 130 ml. of dioxane. To this was added a solution of 28.2 g. (0.3 mole) of phenol dissolved in 50 ml. of water containing 12 g. of sodium hydroxide. The reaction mixture was stirred and refluxed 2 hours. After cooling, the reaction mixture was diluted with water, filtered and the white crystalline solid water-washed. The oven-yield was 53 g. (92.5% from the dichloride), m.p. 199°–201°C. A sample recrystallized from 2-butanone (15 ml./g.) had a melting point of 199°–200°C.

EXAMPLE IV

The effects of the chain couplers of this invention on the polymerization of polyethylene terephthalate were examined in the following manner A one gallon polymerization vessel was used to mix and polymerize the reaction mixtures. In each run, 8 moles of dimethyl terephthalate (1552 grams), 17.6 moles of ethylene glycol (1092 grams or 1 liter), and a catalyst system of 0.388 g. Zinc acetate . $2H_2O$ (stannous octoate) and 0.388 g. $Sb_2O_3$ were used as the standard reaction mixture to which the chain couplers were added.

To measure the intrinsic viscosity readily during the rapid polymerization of the reaction mixtures, a stirrer was calibrated to indicate the intrinsic viscosity of the particular reaction mixture used in this example by correlating the power load of the stirrer at measured intrinsic viscosities for the polymerization systems used in this example. By measuring the power load of the stirrer (i.e., amperage required) at a given r.p.m. during the reaction, the intrinsic viscosity may be accurately measured at any given time. The original intrinsic viscosity measurements were made with a Series 75 Cannon-Fenske viscometer. This device is a glass U-tube designed to give relative viscosity measurements by timing the flow through a fixed length of a capillary of a definite volume of the solution or solvent under test, the temperature of the assembly being maintained in a water bath at 31.5°C ±.05°C. Anhydrous trifluoroacetic acid is the solvent, and the polyester polymer concentration used is 0.5 g/100 ml of solution.

Definitions of various viscosity terms follows:

$$\text{Relative viscosity} = \frac{\text{flow time of solution in seconds}}{\text{flow time of solvent in seconds}}$$

$$\text{Inherent viscosity} = \frac{\text{log. relative viscosity}}{\text{concentration in grams/100 ml of solution}}$$

$$\text{Intrinsic viscosity} = \frac{\text{limit log. relative viscosity}}{C - O \text{ concentration in grams/100 ml of solution}}$$

In this example, various chain-coupling agents of this invention and the prior art were added in various amounts to the reaction mixtures described above when an intrinsic viscosity of 0.3 was reached in each run. Reaction temperatures were kept between 280°–285°C. during all runs. The time for the intrinsic viscosity of the reaction mixture to reach 0.6 from 0.3 was measured.

| One-gallon Kettle Run No. | Additive | Phenoxy Eq. Wt. | Wt. % added | Ratio of Phenoxy groups: Polymer hydroxyl groups | Polymerization Time (IV=0.3–0.6) | |
|---|---|---|---|---|---|---|
| | | | | | Minutes | % of Conrol |
| 793 | None | — | — | — | 25 | — |
| 809 | Triphenyl Cyanurate | 119 | 2.0 | 0.67 | 4 | 16 |
| 860 | Triphenyl Cyanurate | 119 | 2.0 | 0.67 | 4 | 16 |
| 887 | Triphenyl Cyanurate | 119 | 1.0 | 0.34 | 7 | 28 |
| 888 | Triphenyl Cyanurate | 119 | 0.75 | 0.25 | 11 | 44 |
| 810 | Morpholino diphenoxytriazine | 175 | 1.0 | 0.23 | 20 | 80 |
| 827 | Morpholino diphenoxytriazine | 175 | 1.0 | 0.23 | 20 | 80 |
| 886 | Morpholino diphenoxytriazine | 175 | 3.0 | 0.68 | 25 | 100 |
| 825 | Diphenylamino diphenoxytriazine | 216 | 1.2 | 0.22 | 14 | 56 |
| 885 | Diphenylamino diphenoxytriazine | 216 | 3.0 | 0.55 | 14 | 56 |
| 819 | Anilino diphenoxytriazine | 178 | 1.0 | 0.22 | 17 | 68 |
| 826 | Anilino diphenoxytriazine | 178 | 1.0 | 0.22 | 20 | 80 |
| 818 | Dimethylamino diphenoxytriazine | 154 | 1.0 | 0.26 | 22 | 88 |
| 823 | Methylamino diphenoxytriazine | 147 | 1.0 | 0.27 | 30 | 120 |
| 824 | Phenyl diphenoxytriazine | 170.5 | 1.0 | 0.23 | 20 | 80 |

-continued

| One-gallon Kettle Run No. | Additive | Phenoxy Eq. Wt. | Wt. % added | Ratio of Phenoxy groups: Polymer hydroxyl groups | Polymerization Time (IV=0.3–0.6) Minutes | % of Conrol |
|---|---|---|---|---|---|---|
| 889 | Tri-o-chlorophenyl cyanurate | 153.5 | 1.3 | 0.34 | 11 | 44 |
| 893 | tri-p-methoxyphenyl cyanurate | 149 | 1.25 | 0.34 | 6 | 24 |
| 955 | Tri-o-isopropylphenyl cyanurate | 161 | 2.0 | 0.50 | 5 | 20 |
| *808 | Diphenyl terephthalate | 159 | 2.0 | 0.50 | 31 | 124 |
| *807 | Diphenyl carbonate | 107 | 1.8 | 0.67 | 35 | 140 |
| *806 | Diphenyl carbonate | 107 | 0.5 | 0.19 | 26 | 104 |

*Prior art compounds

As can be seen from the above data, the chain-couplers of this invention were generally superior to the prior art compounds in increasing the rate of polyethylene terephthalate polymerization. Triphenyl cyanurate was particularly efficient in decreasing the reaction time, reducing the final half reaction time to one fifth that of the prior systems.

Phenoxy equivalent weights and phenoxy groups per polymer hydroxyl groups at the time of the addition of the chain-coupling agents were determined as follows The phenoxy equivalent weight was determined by dividing the molecular weight of the coupling agent by the number of phenoxy groups per molecule; and the ratio of the phenoxy groups to polymer hydroxyl groups is measured by assuming two hydroxyl groups (terminal groups) per polymeric molecule at 0.3 intrinsic viscosity and by using the knowledge that at an intrinsic viscosity of 0.3 the molecular weight of the polymer has been measured at about 8000. The polymeric intermediate thus has a hydroxyl equivalent weight of 4000. The ratio of phenoxy groups to polymer hydroxyl groups in each run can readily be determined from this information.

The ratio of phenoxy groups to polymer hydroxyl groups is a fairly effective measure of the useful amounts of the chain-coupling agents to be added to polyesterification reaction mixtures at about an intrinsic viscosity of 0.3. This ratio at an intrinsic viscosity for the polyesterification reaction mixture of about 0.3 should be at least about 0.15 and preferably at least about 0.20. Increases in the polymerization rate will be noted with increasing amounts of chain-coupler; however, a definite limit in the polymerization rate does occur beyond which the further addition of chain-couplers has no further advantage. The limit for a given coupler appears to be a property of the individual compounds both with regard to the ultimate rate and the amount of coupler necessary to reach such a limit.

EXAMPLE V

The following compounds, which are useful in the practice of this invention, were formed by the appropriate reaction (II, III or IV) described above. The compounds are listed according to the substituent groups R and X of Formula I.

| Mechanism of Formation | R— | X— | Recryst. Solvent | M.P. °C. | Reported M.P. °C. |
|---|---|---|---|---|---|
| As Ex. I | 2-isopropylphenoxy | ortho-HC(CH₃)₂ | Ethyl acetate | 142–142.5° | |
| As Ex. I | phenoxy | H— | Dimethyl formamide | 234–235° | 235–236° |
| As Ex. I | 2-chlorophenoxy | ortho-Cl— | 2 Butanone | 174–175° | |
| As Ex. I | 4-methoxyphenoxy | para-CH₃O | Dioxane | 199–200° | |
| Method I | morpholino | H— | Ethyl acetate | 166–167.5° | |
| Method I | (CH₃)₂N—C₃H₆N(H)— | H— | Trichloroethylene | 116–117° | |
| Method I | piperidino | H— | Ethyl acetate | 129–130° | 130° |
| Method I | pyrrolidino | H— | Ethyl acetate | 132–134° | |
| Method I | (CH₃)₂N— | H— | — | 141–142° | 144–145° |
| Method I | CH₃NH— | H— | Ethyl acetate | 157–159° | |

-continued

| Mechanism of Formation | R— | X— | Recryst. Solvent | M.P. °C. | Reported M.P. °C. |
|---|---|---|---|---|---|
| Method II | (phenyl)-NH- | H— | Ethyl acetate | 157–158° | 155–156° |
| Ex. III | (phenyl)$_2$N- | H— | 2-Butanone | 199–200° | 197° |
| Method III | (phenyl)- | H— | Cyclohexane | 95–96° | 116° |
| Method I | CH$_3$-N(piperazinyl)N- | H— | Cyclohexane | 113–116° | |
| Method I | C$_6$H$_{13}$NH— | H— | Cyclohexane | 105° | |

As can be seen, the compounds for use in the practice of this invention can be made through the process mechanisms described in the specification.

EXAMPLE VI

In order to evaluate the film properties of polyethylene terephthalate resins prepared with the chain coupling agents of this invention, one gallon batches of the polyester resin were prepared using varying quantities of chain couplers added at different stages of polymerization. The resin batches were then extruded into 10-mil thick films and then biaxially stretch oriented so as to elongate the film to 3 times its original dimensions. Tensile strength and elongation to break were measured in both the machine and cross tenter directions of the film. Heat stability of 220°C was also measured by a flex test in the following manner Two 1 × 7 test strips of film were cut in the machine direction of the sample, being selected from different areas of the web, avoiding the original slit edges.

The test strip was suspended on one end and lightly weighted at the other, and then vertically suspended in an oven at 220°C. having moderate air flow, removed at 15-minute intervals or multiples thereof, cooled to 23° ± 1°C. at 50 + 2% R.H., and tested for brittleness.

The brittleness test was made by folding the end of the aged film through an angle of 180° to fold it approximately on its transverse-direction center line. Firm thumb pressure was exerted to crease the film. The film was examined for failure along the fold line. If failure had not occurred, the sample was reverse-folded through 360°, again creased and inspected. If the sample was still intact, a 180° fold and crease was made on the machine-direction center line of the sample, again followed by examination for film failure. If the sample remained intact, a final reverse 360° fold was made on the machine-direction center line. If the sample still did not break or tear after one or more of these folds and creases, it had passed the test for that aging time in the oven.

Additional sets of samples were run at intervals of 15 minutes until film failure was encountered.

The results were as follows:

| One-gallon kettle Run No. | Coupling Agent | Wt. % of Additive Time of Addition | Tensile Strength M | Tensile Strength T | Elongation to Break M | Elongation to Break T | Heat *Stability at 220°C. | Polymerization Time |
|---|---|---|---|---|---|---|---|---|
| 809 | Triphenyl Cyanurate | 2 at IV = 0.3 | 25.7 | 28.8 | 100 | 70 | 3 hours | → 0.3, 22 min., 0.3 → 0.6 4 min. |
| 860 | Triphenyl Cyanurate | 2 at IV = 0.3 | 13.9 | 18.8 | 89 | 103 | 6–6½ | 0.3 → 0.6 4 min. |
| 825 | Diphenylamino diphenoxytriazine | 1.2 at IV = 0.3 | 19.6 | 14.8 | 129 | 100 | 4½–5 | 0.3 → 0.6 14 min. |
| 842 | Triphenyl Cyanurate | 0.67 initially | 13.6 | 28.9 | 16 | 25 | ¼ | 65 min. |
| 846 | Triphenyl Cyanurate | 0.67 before vacuum T=250° | 14.1 | 18.9 | 17 | 45 | ¾ | 60 min. |
| 847 | Triphenyl Cyanurate | 1.84 initially | 16.5 | 20.3 | 63 | 59 | 5½ | 8 min. to 0.3 0.3 → 0.6 28 min. |
| 848 | Triphenyl Cyanurate | 3.68 initialy | 13.1 | 13.7 | 15 | 6 | 8 | 17 min. |

*Samples heat-set 60 sec. at 120°C.

The trifunctional coupling agent triphenyl cyanurate is of most interest because of the resulting very rapid viscosity build up when it is added to a polyethylene Terephthalate polymerization. Although extreme brittleness might be expected with this additive, the resulting films exhibited satisfactory tensile and elongation properties.

The phenoxy-s-triazine additives resulted in film with improved heat stability, as indicated by the flex test after aging at 220°C.

When triphenyl cyanurate was added initially or before vacuum, the resulting films had inferior tensile and elongation properties, showing the desirability of adding the coupling agent after polymerization has been initiated.

In order to evaluate film more completely and accurately, two 10 gallon kettle resin preparations were made, adding 2% (1 lb.) of triphenyl cyanurate at about the midpoint of the vacuum cycle. Terephthalic acid was used with a lithium carbonate - zinc acetate -antimony oxide catalyst system. A very fast polymerization occurred after the addition of the triphenyl cyanurate at about IV 0.3. The polymerization rate approximated that observed during the 1 gallon kettle runs. Results are summarized below:

| Run | Total Vacuum Cycle | Polymerization Time After Addition | Final IV | MP | Final Kettle Pressure |
|---|---|---|---|---|---|
| A | 78 min. | 15 min. | 0.71 | 255°C | 20.5 mm. |
| B | 68 | 13 | 0.60 | 255°C | 4.5 |

Quenched, amorphous samples from A were slightly yellow; B run samples were nearly colorless. The resins were tough and drawable. Run A advanced further than desired. Because of the high kettle pressure, it appeared to contain some phenol. The two lots of resins were blended in the grinder and converted to film by extrusion, orientation and heat-setting. This film had the following physical properties:

| | | MD | TD |
|---|---|---|---|
| (MSPI) | Break Strength | 27.7 | 25.7 |
| (%) | Break Elongation | 65 | 111 |
| (MSPI) | Modulus | 825 | 739 |
| | Heat Shrinkage (%) | | |
| | 150°C. | 2.1 | 1.2 |
| | 200 20 C. | 6.35 | 4.5 |
| | Melting Point: 253.4°C | | |
| | Density: 1.387 | | |

EXAMPLE VII

In order to evaluate the chain couplers of the present invention with different methods of polymerization, batches of resin were prepared in 10-gal. kettles from terephthalic acid and ethylene glycol. The catalyst used in the preparation of these resins was zinc acetate . 2H$_2$O (.02% by weight of polymer) and antimony oxide (Sb$_2$O$_3$, .02% by weight of polymer). The polyesterification was allowed to proceed until the reaction mixture reached an inherent viscosity of ~0.3. At this time 0.5% by weight of the polymer of triphenyl cyanurate was blened into the mixture. The process was allowed to proceed to about 0.6 intrinsic viscosity.

The resin was then ground and sieved. Particles which were retained on a number 5 sieve were used in a solid state polymerization process at 460°F in a controlled stream of nitrogen. The viscosity was measured as the solid state polymerization proceeded. The results for such polymerization with and without a chain coupling agent of the present invention are shown below.

| TIME (Hours) | VISCOSITY With Triphenyl Cyanurate | Without Triphenyl Cyanurate |
|---|---|---|
| 0 | 0.63* | 0.56* |
| 1 | 0.76 | 0.67 |
| 1.5 | 1.02 | 0.73 |
| 2.0 | 1.25 | 0.78 |
| 2.5 | 1.47 | 0.83 |
| 3.0 | 1.67 | 0.86 |
| 10.0 | — | 1.13 |
| 15.0 | — | 1.24 |

*Intrinsic viscosity. All other values are inherent viscosity because of measuring procedures.

The substantially increased rate of polymerization and the significantly higher viscosities obtainable through the use of the chain coupling agents of the present invention are apparent. Although the comparative runs did not proceed from identical intrinsic viscosities (all other measurements inherent viscosity), the rate of polymerization when compared at similar viscosities for both systems (e.g., 0.76 for system with triphenylcyanurate and 0.78 without) is still substantially increasd with the addition of a chain coupling agent of the present invention.

As can be further seen from the above example, the chain coupling agents of the present invention are useful in solid state polymerization processes for polyesters such as those disclosed in U.S. Pat. 3,075,952 and 3,344,091 and British Pat. 1,066,162.

I claim:

1. In the process of forming a polyester by reacting at least one polyol with at least one polycarboxylic compound the improvement which comprises adding to a reaction mixture of the polyol and polycarboxylic compound after polyesterification has begun, 0.67 to 3.68% by weight of a chain-coupling compound of the formula:

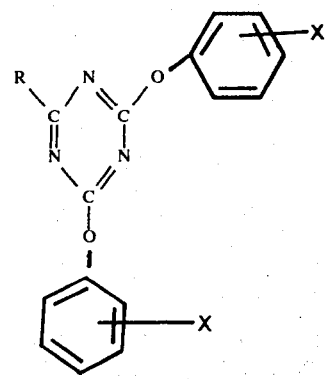

wherein R is an organic radical which will not render the chain-coupling compound thermally unstable at about 280°C, and X is an inert substituent or hydrogen.

2. The process of claim 1 wherein the chain-coupling compound is added to the reaction mixture after the mixture has reached an intrinsic viscosity of at least about 0.2 at 31.5°C ± 0.5°C in a polymer concentration of 0.5 g/100ml in anhydrous trifluoroacetic acid.

3. The process of claim 1 wherein the polyol is a diol and the polycarboxylic compound is a dicarboxylic acid or diester.

4. The process of claim 3 wherein the diol is ethylene glycol and the polycarboxylic compound is terephthalic acid or dimethyl terephthalate.

5. The process of claim 1 wherein R contains no more than 18 atoms in its skeletal structure.

6. The process of claim 1 wherein R is selected from the group consisting of phenoxy, phenyl, lower alkoxy, lower alkylamine, anilino, diphenylamino or 5 and 6 membered heterocyclic rings having at least 4 carbon atoms in the ring chain and where the other members of the ring may be nitrogen or oxygen atoms with at most one oxygen atom, and X is selected from the group consisting of hydrogen, halide, lower alkoxy and lower alkyl.

7. A polyester material which contains within its polymer chain a residue of a chain-coupling compound of the formula:

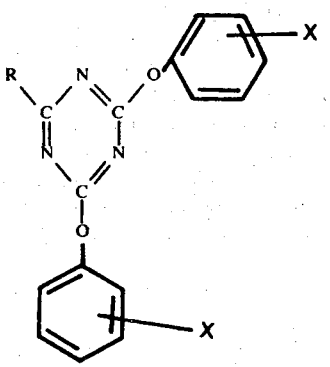

wherein R is an organic radical which will not render the chain-coupling compound thermally unstable at about 280°C, X is an inert substituent and the residue is represented by at least one of the formulae:

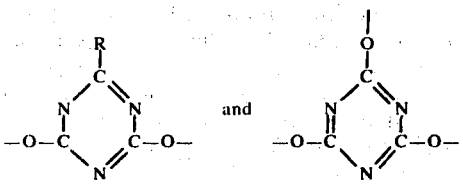

wherein R is as defined above, said polyester being formed by the addition 0.67 to 3.68% by weight of said chain-coupling compound to a reaction mixture of a polyol and polycarboxylic compound after polyesterification has begun.

8. The polyester material of claim 9 wherein R is selected from the group consisting of phenoxy, phenyl, lower alkoxy, lower alkylaminio, anilino, diphenylamino, or 5 and 6 membered heterocyclic rings containing at least 4 carbon atoms in the ring chain and where the other members of the ring chain are nitrogen and oxygen atoms with at most one oxygen atom.

* * * * *

UNITED STATES PATENT OFFICE
CERTIFICATE OF CORRECTION

Patent No. 3,966,680            Dated June 29, 1976

Inventor(s) Robert L. Wear

It is certified that error appears in the above-identified patent and that said Letters Patent are hereby corrected as shown below:

Column 10, first Method I, "Ethyl acetate" should be
-- Ethyl acetate-dioxane mixture --.

Column 11, line 59, "1 x 7" should be -- 1" x 7" --.

Column 13, line 37, "200 20 C" should be -- 200°C --.

Column 13, line 53, "blened" should be -- blended --.

Column 16, line 26, "The polyester material of Claim 9" should be
-- The polyester material of Claim 7 --.

Signed and Sealed this

Thirtieth Day of November 1976

[SEAL]

Attest:

RUTH C. MASON            C. MARSHALL DANN
*Attesting Officer*         *Commissioner of Patents and Trademarks*